(Model.)

D. D. McKERNAN.
DRIVE CHAIN.

No. 297,149. Patented Apr. 22, 1884.

Witnesses:
Frank S. Blanchard
W. W. Elliott

Inventor:
Dennis D. McKernan
By Jno. G. Elliott
Attorney.

UNITED STATES PATENT OFFICE.

DENNIS D. McKERNAN, OF CHICAGO, ILLINOIS.

DRIVE-CHAIN.

SPECIFICATION forming part of Letters Patent No. 297,149, dated April 22, 1884.

Application filed August 30, 1883. (Model.)

*To all whom it may concern:*

Be it known that I, DENNIS D. McKERNAN, a citizen of the United States, residing in Chicago, county of Cook, and State of Illinois, have invented certain new and useful Improvements in Drive-Chains, of which the following is a specification.

My invention relates to improvements in drive-chains the links of which are detachably connected together; and the objects of my invention are to provide laterally attachable and detachable links involving a minimum amount of metal, a maximum of strength, and which may be readily and easily attached to or detached from each other, and when attached effectually prevent accidental detachment, and at the same time permit the links to have a free and extended pivotal movement upon each other; to provide such links with a locking device which may be conveniently and cheaply cast with the link, and when so cast requires no finishing and does not diminish the strength of the link or its hook, or render the use of special construction of the adjacent end bar or hammer blows upon the hook necessary to its effective operation, and, besides, prevents any possibility of disconnecting the links except when out of their operative position; to provide a locking device requiring the links to be brought toward each other, throat side up, beyond a right angle before accidental or other detachment can possibly take place, and only then by repeatedly swinging the links toward and from each other, and at the same time permitting them to have a lateral movement; and to provide a locking device which, when the links are swung as above described, will permit one of the links by its own gravity to automatically make the lateral movement, which, in connection with the to-and-fro movement, is necessary for the detachment of the link. I attain these objects by devices illustrated in the accompanying drawings, in which—

Figure 1:
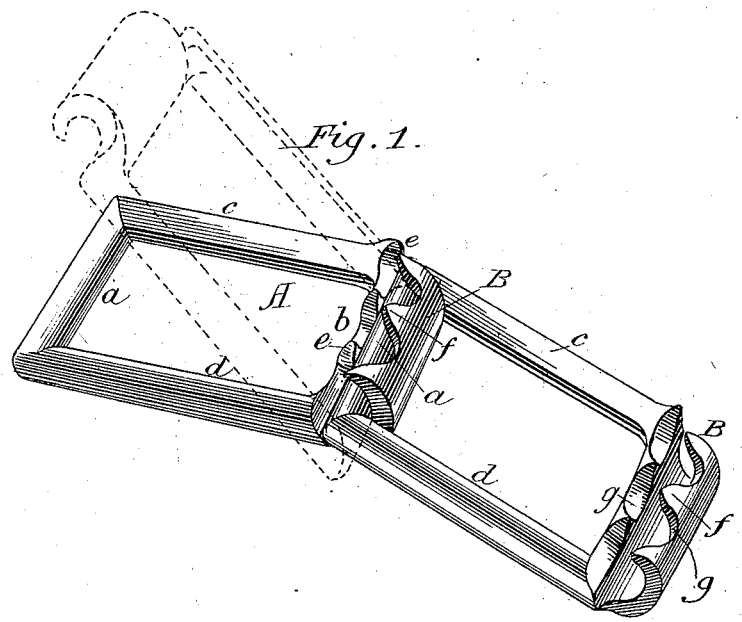
Figure 2:
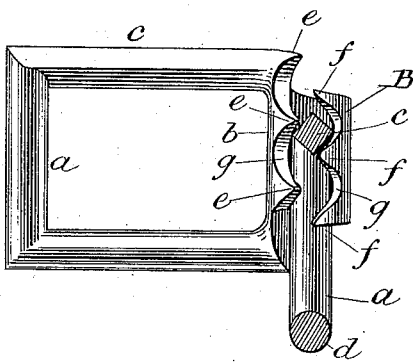
Figure 3:
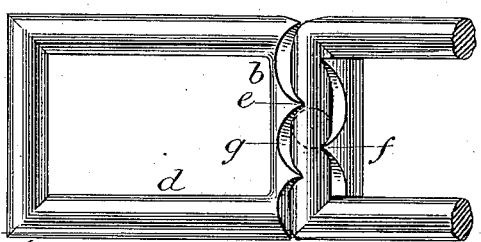

Figure 1 is a perspective of a portion of a drive-chain embodying my invention, the right-hand link being shown by dotted lines in the first position necessary to effect its detachment from the other link, and one side bar of each link being shown rectangular in cross-section. Fig. 2 is a plan view of one link and a sectional view of the other link perpendicular to the first, showing the position of the angular side bar in the hook when detaching the links; and Fig. 3 is a plan view of one of the links with the other broken off and partly in section, both of which links have circular side bars, the dotted circle representing the position of the upper side bar of the broken link when detaching it.

Similar letters of reference indicate the same parts in the several figures of the drawings.

A represents a link having formed therewith a hook, B, said link being composed of two end bars, $a$ $b$, and side bars, $c d$. The end bar $b$ adjacent the hook is provided with laterally-projecting teeth $e$, which in the present instance are three in number, and correspond in this respect with teeth $f$, formed in the end of the hook, which opposing teeth are alternately arranged with reference to each other so as to form an open spiral way adapted to permit the passage of the side bar of an adjacent link, as hereinafter described. One of the side bars of the link—as, for instance, $c$—is made preferably quadrangular in cross-section, (see Figs. 1 and 2,) when it is desirable to employ the narrowest spiral way consistent with the greatest diameter of the side bar—as, for instance, it will be seen that the round side bar in Fig. 3, corresponding in position with the angular side bar $c$, has the same diameter as the greatest diameter of the side bar $c$, but requires a wider spiral way.

In addition to enabling a minimum width of spiral way to be employed in connection with an angular side bar such as is shown, another important advantage is gained—namely, that of more readily attaching or detaching the links, for, as will be seen by referring to Fig. 2, when one corner of the side bar is resting between the teeth of the hooks, the diagonally-opposite corner will have passed below the point of the opposing tooth of the end bar, and if the left-hand link be held vertical the right-hand link need only be swung to the left to cause it to drop down by its gravity into the next bend of the way. In other words, the faces of the angular side bar tend to form guides directing the side bar from one bend to the other of the spiral way, owing to the angular faces of the bar corresponding to the angles of the faces of the way.

In connecting the links the right-hand link is held at an angle between the left-hand link and a perpendicular line thereto, as indicated by dotted lines in Fig. 1, and then moved laterally toward the left-hand link until the outer angular face of the side bar rests against the outer face of the first tooth $e$ of the end bar, and the inner face of the side bar has passed beyond, but in a line parallel to, the inner face of the first tooth on the hook. If, now, the right-hand link, held in this position, be swung past a perpendicular line to the left-hand link, the side bar will enter the first bend in the way, after which, by swinging it back to its first position, it will enter the second bend of the way, and by continuing this to-and-fro movement of the link the side bar will finally pass out of the way and bear upon the outer and straight face of the upper tooth of the hook—in other words, against the side of the hook. The walls of the spiral way between the teeth are beveled, as shown at $g\ g$, so that one or both links can be swung toward and from each other, to enable the side bars to clear the points of the teeth, and to avoid the absence of more metal from the end bar and hook than is necessary for the attachment and detachment of the links.

As shown in Fig. 1, but one of the side bars need be angular, and by having one of them round the links can only be attached in their operative position—that is, with the throats of all the hooks up—for the round side bar cannot possibly enter the way, and, besides, it operates as a stop to prevent the angular bar from being inserted beyond its operative position. The same result may, however, be obtained, even though both side bars are beveled, by thickening the outer side of or elongating the upper tooth $e$ of the end bar, or by having the face of the elongated bevel at the lower end of the end bar in a plane slightly above the bevel between the teeth, which construction is also adaptable to the links shown in Fig. 3.

By constructing links in the manner above described they cannot, except in their operative position, be swung outwardly from each other to an angle of forty-five degrees, and hence they are less liable to accidental detachment than links now commonly used, which have projections on the hook and end bar, and, besides, the tortuous passage provided by the open spiral promotes an effective locking of the links without rendering their attachment and detachment complicated or laborious, or materially weakening the end bar or the hook, and at the same time enables the links to have an extended pivotal movement upon each other without a liability to become detached.

In conclusion it may be stated that the spiral way may be further contracted by having the end bar $a$ somewhat oval in cross-section, and that these links may be so perfectly cast as to require no finishing before attaching them together for use.

Having described my invention, what I claim, and desire to secure by Letters Patent, is—

1. A drive-chain link provided with a transverse horizontal opening forming an open spiral way, said way being formed by alternate projections on the hook and contiguous end bar, substantially as described.

2. A drive-chain link provided with an open spiral way between the hook and contiguous end bar, and having one or both of its side bars angular in cross-section, substantially as described.

DENNIS D. McKERNAN.

Witnesses:
W. W. ELLIOTT,
JNO. G. ELLIOTT.